United States Patent [19]

Mayo

[11] Patent Number: 5,371,213
[45] Date of Patent: Dec. 6, 1994

[54] TITANIUM PHTHALOCYANINE IMAGING MEMBER

[75] Inventor: James D. Mayo, Toronto, Canada
[73] Assignee: Xerox Corporation, Stamford, Conn.
[21] Appl. No.: 111,255
[22] Filed: Aug. 23, 1993
[51] Int. Cl.$^5$ .............................................. C09B 67/50
[52] U.S. Cl. .................................................... 540/141
[58] Field of Search ........................................ 540/141

[56] References Cited

U.S. PATENT DOCUMENTS

| | | | |
|---|---|---|---|
| 4,664,997 | 5/1987 | Suzuki et al. | 540/141 |
| 5,008,173 | 4/1991 | Mimura et al. | 540/141 |
| 5,166,339 | 11/1992 | Duff et al. | 540/142 |
| 5,182,382 | 1/1993 | Mayo et al. | 540/141 |

Primary Examiner—Mukund J. Shah
Assistant Examiner—Pavanaram K. Sripada
Attorney, Agent, or Firm—E. O. Palazzo

[57] ABSTRACT

A process for the preparation of titanyl phthalocyanine Type 1a which comprises admixing Type I titanyl phthalocyanine with a component that enables dissolution thereof; adding the resulting dissolved titanyl phthalocyanine pigment to a solvent mixture thereby enabling reprecipitation of said pigment; and subsequently contacting the Type X titanyl phthalocyanine formed with hot halobenzene.

26 Claims, No Drawings

TITANIUM PHTHALOCYANINE IMAGING MEMBER

BACKGROUND OF THE INVENTION

This invention is generally directed to titanyl phthalocyanines, imaging members and processes for the preparation thereof, and more specifically the present invention is directed to processes for obtaining titanyl phthalocyanine Type 1a polymorph and layered photoconductive members comprised of the aforementioned titanyl phthalocyanine polymorph. In embodiments, the present invention is directed to imaging members containing as a photogenerating pigment titanyl phthalocyanine Type 1a prepared by a two step direct process which comprises treating Type X titanyl phthalocyanine with a halobenzene, such as heated chlorobenzene or chloronaphthalene. The titanyl phthalocyanine Type 1a can be selected as an organic photogenerator pigment in photoresponsive imaging members containing charge transport components, especially hole transport layers such as known aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 700 to about 800 nanometers, thus diode lasers can be selected as the light source.

Certain titanium phthalocyanine pigments have been known, reference the publication WW 2 (PB 85172 Fiat Final Report 1313, Feb. 1, 1948). Specific titanyl phthalocyanines or oxytitanium phthalocyanines are known to absorb near-infrared light at about 800 nanometers and a number of such pigments have been illustrated in the prior art as materials for IR laser optical recording material, reference for example BASF German 3,643,770 and U.S. Pat. No. 4,458,004. The use of certain titanium phthalocyanine pigments as a photoconductive material for electrophotographic applications is known, reference for example British Patent Publication 1,152,655, the disclosure of which is totally incorporated herein by reference. Also, U.S. Pat. No. 3,825,422 illustrates the use of titanyl phthalocyanine as a photoconductive pigment in an electrophotographic process known as particle electrophoresis. Additionally, the utilization of certain titanyl phthalocyanines and substituted derivatives thereof in a dual layer electrographic device is illustrated in EPO 180931, May 14, 1986. Moreover, the use of tetra- and hexadeca-flouro-substituted titanyl phthalocyanine in an electrophotographic device is illustrated in U.S. Pat. No. 4,701,396. In Japanese Patent Publication 64-171771, August, 1986, there is illustrated the use of titanyl phthalocyanine, which has been treated with a hot solvent, in electrophotography. Further, in German 3,821,628 there is illustrated the utilization of certain titanyl phthalocyanines, and other pigments in electrophotography, and wherein the titanyl phthalocyanines have been purified primarily to reduce the level of ash, volatile contaminants and sodium to below specified levels.

In the textbook *Phthalocyanine Compounds* by Moser and Thomas, the disclosure of which is totally incorporated herein by reference, it is indicated that polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also described. These different polymorphic forms are usually distinguishable on the basis of differences in the solid state properties of the materials which can be determined by measurements, such as Differential Scanning Calorimetry, Infrared Spectroscopy, Ultraviolet-Visible-Near Infrared spectroscopy and, especially, X-Ray Powder Diffraction techniques. There appears to be general agreement on the nomenclature used to designate specific polymorphs of commonly used pigments such as metal-free and copper phthalocyanine. However, this does not appear to be the situation with titanyl phthalocyanines as different nomenclature is selected in a number of instances.

The X-ray powder diffraction traces (XRPDs) obtained from 5 forms of titanyl phthalocyanine are illustrated in U.S. Pat. No. 5,166,339 (D/90198), the disclosure of which is totally incorporated herein by reference and which were generated on a Philips X-Ray Powder Diffractometer Model 1710 using X-radiation of CuK$\alpha$ wavelength ($\lambda$=0.1542 nanometers). The diffractometer was equipped with a graphite monochrometer and pulse-height discrimination system. Two-theta is the Bragg angle commonly referred to in x-ray crystallographic measurements. I(counts) represents the intensity of the diffraction as a function of Bragg angle as measured with a proportional counter. Subclasses of these forms with broad, more poorly resolved peaks than those shown in FIGS. 1A, 1B, 1C, 1D and 1E can be envisioned, however, the basic features of the diffractograms indicate the major peaks in the same position, although the smaller peaks can be unresolved. This broadening of XRPD peaks is generally found in pigments having a very small particle size. In Table 1 that follows, there is provided a listing of documents that disclose titanyl phthalocyanine polymorpic forms classified as belonging to one of the main types as indicated.

TABLE 1

| Crystal Form | Other Names | Documents |
|---|---|---|
| Type I | β | Toyo Ink Electrophotog. (Japan) 27,533 (1988) |
| | β | Dainippon U.S. Pat. No. 4,728,592 |
| | β | Sanyo-Shikiso JOP 63-20365 |
| | A | Mitsubishi JOP 62-25685, -6, -7 Conference Proceedings |
| | A | Konica "Japan Hardcopy", 1989, 103, (1989) |
| Type II | α | Toyo Ink "Electrophoto (Japan)" 27,533 (1988) |
| | α | Sanyo-Shikiso JOP 63-20365 |
| | α | Konica U.S. Pat. No. 4,898,799 |
| | α | Dainippon U.S. Pat. No. 4,728,592 |
| | α | Mita EU 314,100 |
| | B | Mitsubishi JOP 62-25685, -6, -7 |
| | B | Konica "Japan Hardcopy", 1989, 103, (1989) |
| Type III | C | Mitsubishi OP 62-25685, -6, -7 |
| | C | Konica "Japan Hardcopy", 1989, 103, (1989) |
| | m | Toyo Ink "Electrophoto (Japan)" 27,533 (1988) |

TABLE 1-continued

| Crystal Form | Other Names | Documents |
| --- | --- | --- |
| Type IV | y<br>Unnamed<br>New Type | Konica "Japan Hardcopy", 1989, 103, (1989)<br>Konica U.S. Pat. No. 4,898,799<br>Sanyo-Shikiso JOP 63-20365 |

More specifically, the aforementioned documents illustrate, for example, the use of specific polymorphs of TiOPc in electrophotographic devices. Three crystal forms of titanyl phthalocyanine, differentiated by their XRPDs, were specifically illustrated, identified as A, B, and C, which it is believed are equivalent to Types I, II, and III, respectively. In Japanese 62-256865 there is disclosed, for example, a process for the preparation of pure Type I involving the addition of titanium tetrachloride to a solution of phthalonitrile in an organic solvent which has been heated in advance to a temperature of from 160° to 300° C. In Japanese 62-256866, there is illustrated, for example, a method of preparing the aforementioned polymorph which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II (B) titanyl phthalocyanine, which involves a similar method except that the time to heat the mixture at from 100° to 170° C. is maintained for at least two and one half hours. Types I and II, in the pure form obtained by the process of the above publications, apparently afforded layered photoresponsive imaging members with excellent electrophotographic characteristics.

In Mita EPO Patent Publication 314,100, there is illustrated the synthesis of TiOPc by, for example, the reaction of titanium alkoxides and diiminoisoindolene in quinoline or an alkylbenzene, and the subsequent conversion thereof to an alpha type pigment (Type II) by an acid pasting process, whereby the synthesized pigment is dissolved in concentrated sulfuric acid, and the resultant solution is poured onto ice to precipitate the alpha-form, which is filtered and washed with methylene chloride. This pigment, which was blended with varying amounts of metal free phthalocyanine, could be selected as the charge generating layer in layered photoresponsive imaging members with a high photosensitivity at, for example, 780 nanometers.

In Sanyo-Shikiso Japanese 63-20365/86, reference is made to the known crystal forms alpha and beta TiOPc (Types II and I, respectively, it is believed), which publication also describes a process for the preparation of a new form of titanyl phthalocyanine, which is apparently not named. This publication appears to suggest the use of the unnamed titanyl phthalocyanine as a pigment and its use as a recording medium for optical discs. This apparently new form was prepared by treating acid pasted TiOPc (Type II form, it is believed) with a mixture of chlorobenzene and water at about 50° C. The resulting apparently new form is distinguished on the basis of its XRPD, which appears to be identical to that shown in FIG. 1 for the Type IV polymorph.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta type TiOPc (Type I) as a pigment, which is believed to provide a much poorer quality photoreceptor.

In Konica Japanese 64-17066/89, there is disclosed, for example, the use of a new crystal modification of TiOPc prepared from alpha type pigment (Type II) by milling it in a sand mill with salt and polyethylene glycol. This pigment had a strong XRPD peak at a value of 2 theta of 27.3 degrees. This publication also discloses that this new form differs from alpha type pigment (Type II) in its light absorption and shows a maximum absorbance at 817 nanometers compared to the alpha-type, which has a maximum at 830 nanometers. The XRPD shown in the publication for this new form is believed to be identical to that of the Type IV form previously described by Sanyo-Shikiso in JOP 63-20365. The aforementioned Konica publication also discloses the use of this new form of TiOPc in a layered electrophotographic device having high sensitivity to near infrared light of 780 nanometers. The new form is indicated to be superior in this publication to alpha type TiOPc (Type II). Further, this new form is also described in U.S. Pat. No. 4,898,799 and in a paper presented at the Annual Conference of Japan Hardcopy in July 1989. In this paper, this same new form is referred to as Type y, and reference is also made to Types I, II, and III as A, B, and C, respectively.

In the journal, *Electrophotography* (Japan), vol. 27, pages 533 to 538, Toyo Ink Manufacturing Company, there is disclosed, for example, alpha and beta forms of TiOPc (Types I and II, it is believed) and also this journal discloses the preparation of a Type m TiOPc, an apparently new form having an XRPD pattern which was distinct from other crystal forms. It is believed that this XRPD is similar to that for the Type III titanyl phthalocyanine pigment, but it is broadened most likely as the particle size is much smaller than that usually found in the Type III pigment. This pigment was used to prepare photoreceptor devices having greater sensitivity at 830 nanometers than alpha or beta type TiOPc (Type II or I, respectively).

In Mitsubishi Laid Open Japanese Application 90-269776, laid open date Nov. 5, 1990, the disclosure of which is totally incorporated herein by reference, there is illustrated the preparation of titanyl phthalocyanines by the treatment of phthalocyanines, such as metal free, metal phthalocyanines, or their derivatives with solvents containing at least trifluoroacetic acid, or mixed solvents of trifluoroacetic acid and halogenated hydrocarbons such as methylene chloride. In Example I of this Japanese Laid Open Application, the preparation of the C-form of TiOPc is described. Other forms obtained are described in Examples II and III.

Processes for the preparation of specific polymorphs of titanyl phthalocyanine, which require the use of a strong acid, such as sulfuric acid, are known, and these processes, it is believed, are not easily scalable. One process as illustrated in Konica Japanese Laid Open on Jan. 20, 1989 as 64-17066 (U.S. Pat. No. 4,643,770 appears to be its equivalent), the disclosures of which are totally incorporated herein by reference, involves, for example, the reaction of titanium tetrachloride and phthalodinitrile in 1-chloronaphthalene solvent to produce dichlorotitanium phthalocyanine which is then subjected to hydrolysis by ammonia water to enable the Type II polymorph. This phthalocyanine is preferably treated with an electron releasing solvent, such as 2-ethoxyethanol, dioxane, N-methylpyrrolidone, followed by subjecting the alpha-titanyl phthalocyanine to milling at a temperature of from 50° to 180° C. In a second method described in the aforementioned Japanese Publication, there is disclosed the preparation of alpha type titanyl phthalocyanine with sulfuric acid. Another method for the preparation of Type IV titanyl phthalocyanine involves the addition of an aromatic hydrocarbon solvent to an aqueous suspension of Type II titanyl phthalocyanine prepared by the well-known acid pasting process, and heating the resultant suspension to about 50° C. as disclosed in Sanyo-Shikiso Japanese 63-20365, Laid Open on Jan. 28, 1988. In Japanese 171771/1986, Laid Open Aug. 2, 1986, there is disclosed the purification of metallophthalocyanine by treatment with N-methylpyrrolidone.

To obtain a TiOPc-based photoreceptor having high sensitivity to near infrared light, it is believed necessary to control not only the purity and chemical structure of the pigment, as is generally the situation with organic photoconductors, but also to prepare the pigment in the correct crystal modification. A number of the disclosed processes used to prepare specific crystal forms of TiOPc, such as Types I, II, III and IV, are either complicated and difficult to control as in the preparation of pure Types I and II pigment by the processes described in Mitsubishi Japanese 62-25685, -6 and -7; involve harsh treatment such as sand milling at high temperature, reference Konica U.S. Pat. No. 4,898,799; or dissolution of the pigment in a large volume of concentrated sulfuric acid, a solvent which is known to cause decomposition of metal phthalocyanines, reference Sanyo-Shikiso Japanese 63-20365, and Mita EPO 314, 100.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

The use of selected perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is, for example, disclosed in this publication N,N'-bis(3-methoxypropyl)perylene-3,4,9,10-tetracarboxyldiimide dual layered negatively charged photoreceptors with improved spectral response in the wavelength region of 400 to 700 nanometers. A similar disclosure is revealed in Ernst Gunther Schlosser, *Journal of Applied Photographic Engineering*, Vol. 4, No. 3, page 118 (1978). There are also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there are specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a perylene pigment photogenerating component. Both of the aforementioned patents disclose an aryl amine component as a hole transport layer.

Moreover, there are disclosed in U.S. Pat. No. 4,419,427 electrographic recording mediums with a photosemiconductive double layer comprised of a first layer containing charge carrier perylene diimide dyes, and a second layer with one or more compounds which are charge transporting materials when exposed to light, reference the disclosure in column 2, beginning at line 20.

In copending application U.S. Ser. No. 537,714 (D/90087), the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example, U.S. Pat. No. 4,429,029 mentioned hereinbefore.

In U.S. Pat. No. 5,153,313 (D/90244), the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In U.S. Pat. No. 5,166,339 (D/90198), the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I, or β-type titanyl phthalocyanine as determined by X-ray powder diffraction; dissolving the resulting titanyl phthalocyanine in a mixture of trifluoroacetic acid and methylene chloride; adding the resulting mixture to a stirred organic solvent, such as methanol, water, or mixtures thereof; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide, titanium tetraalkoxides such as titanium tetra-methoxide, -ethoxide, -propoxide, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120° to about 300° C.; specific polymorphs of titanyl phthalocyanine such as Type I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-, alkyls with from 1 to about 6 carbon atoms such as methyl-, ethyl-, propyl-, isopropyl-, butyl-, pentylo, and hexyl-; nitro, amino, alkoxy and alkylthio, such as methoxy-, ethoxy- and propylthio- groups; and mixtures thereof.

Disclosed in U.S. Pat. No. 5,164,493 (D/90524), the disclosure of which is totally incorporated herein by reference, is a process for the preparation of titanyl phthalocyanine Type I which comprises the addition in a solvent of titanium tetraalkoxide to a mixture of phthalonitrile and a diiminoisoindolene, followed by heating. The disclosure of this application is totally incorporated herein by reference.

Disclosed in U.S. Pat. No. 5,189,156 (D/91152), the disclosure of which is totally incorporated herein by reference, is a process for the preparation of titanyl phthalocyanine Type I which comprises the reaction of titanium tetraalkoxide and diiminoisoindolene in the presence of a halonaphthalene solvent; and U.S. Pat. No. 5,206,359 (D/91151), the disclosure of which is totally incorporated herein by reference, is a process for the preparation of titanyl phthalocyanine Type IV having outstanding electrophotographic properties, which comprises the treatment of titanyl phthalocyanine Type X with monochlorobenzene at room temperature to provide Type IV TiOPc.

Illustrated in copending patent application U.S. Ser. No. 024,145 (D/92270), the disclosure of which is totally incorporated herein by reference, is a process for the preparation of a more perfect crystalline form of the Type I polymorph of titanyl phthalocyanine which comprises dissolving a precursor titanyl phthalocyanine Type I in a solution of trihaloacetic acid and alkylene chloride; adding the resultant solution to a solvent thereby enabling precipitation of Type X titanyl phthalocyanine; separating the titanyl phthalocyanine Type X from the solution; followed by a first washing with an organic solvent and a second washing with water; slurrying the resulting Type X titanyl phthalocyanine in an organic solvent enabling conversion of said Type X to Type IV titanyl phthalocyanine; and thereafter, subjecting the Type IV titanyl phthalocyanine obtained to treatment with an organic solvent to enable said crystalline form of titanyl phthalocyanine Type I; and a process in accordance with claim 1 wherein said Type X polymorph is slurried at about 25° C. in from about 10 volume parts to about 100 volume parts of chlorobenzene for a period of from about 1 minute to about 120 minutes.

Illustrated in U.S. Pat. No. 5,330,867 is a layered imaging member comprised of a photogenerating layer of titanyl phthalocyanine prepared by depositing amorphous titanyl phthalocyanine on a substrate maintained at a temperature of from below 25° to about minus 30° C.; and contacting the substrate product with an aliphatic alcohol; in U.S. Pat. No. 5,288,574 is a layered photoconductive imaging member comprised of a supporting substrate, a photogenerating layer comprised of titanyl phthalocyanine photogenerating pigments and thereover a charge transport layer, and wherein said photogenerating pigments are prepared by a process which comprises the formation of a slurry comprised of dihalotitanium phthalocyanine in a mixture comprised of a trihaloacetic acid and an alkylene chloride; adding the resultant slurry to a mixture of an aliphatic alcohol and water enabling hydrolysis whereby Type X oxytitanium phthalocyanine is obtained; separating the Type X oxytitanium phthalocyanine from the slurry; and thereafter subjecting the Type X oxytitanium phthalocyanine obtained to treatment with a halobenzene, followed by the separation of Type IV oxytitanium phthalocyanine photogenerating pigments; and in U.S. Pat. No. 5,334,478 is a layered photoconductive imaging member comprised of a supporting substrate, a photogenerating layer and a charge transport layer, and wherein the photogenerating layer contains Type IV titanyl phthalocyanine obtained by a process which comprises the addition of an oxytitanium phthalocyanine containing a mixture of Type I and Type II titanyl phthalocyanine polymorphs, or a substantially pure Type II titanyl phthalocyanine polymorph to a solvent comprised of a trihaloacetic acid and an alkylene halide; adding the resultant solution to a mixture which enables precipitation of Type X oxytitanium phthalocyanine; separating the Type X oxytitanium phthalocyanine from the solution; and thereafter subjecting the Type X oxytitanium phthalocyanine obtained to treatment with a halobenzene, followed by the separation of the Type IV oxytitanium phthalocyanine.

The disclosures of all of the aforementioned publications, laid open applications, copending applications and patents are totally incorporated herein by reference.

Advantages of the processes of the present invention include the use of only two steps to prepare the titanyl phthalocyanine photogenerator pigment; rapid preparation times, for example, in embodiments, 2 hours or less, as compared, for example, about 48 hours to convert from Type IV to Type Ia in methylene chloride, reference U.S. Ser. No. 024,145 (D/92270); and a shorter dwell time of the Type X pigment in the final conversion solvent, which restricts the crystal growth of the Type X pigment and allows a more perfect form of the titanyl phthalocyanine Type Ia to form.

SUMMARY OF THE INVENTION

It is an object of the present invention to provide imaging members, and processes for the preparation of titanyl phthalocyanines with many of the advantages illustrated herein.

It is yet another object of the present invention to provide economically scalable processes for the preparation of titanyl phthalocyanines.

Another object of the present invention relates to the preparation of titanyl phthalocyanine polymorph Type I a.

Further, another object of the present invention relates to the preparation of photogenerating titanyl phthalocyanine Type 1a by dissolving Type I titanyl phthalocyanine in a strong acid, for example sulfuric acid or trifluoroacetic acid, reprecipitating the dissolved pigment in a nonsolvent system, for example water, methanol, or mixtures thereof, isolating the resulting Type X titanyl phthalocyanine, and thereafter contacting the Type X with chlorobenzene at a temperature of from about 60° C. to about 130° C. for a period of from about 30 minutes to about 24 hours, and preferably about 2 hours. Alternatively, the Type X can be treated with a halonaphthalene like 1-chloronaphthalene at a temperature of from about 25° C. to about 225° C. for a period of from about 2 hours to about 24 hours, and preferably about 2 hours. The Type I selected as a reactant can be obtained from a number of sources, or can be prepared as illustrated herein, reference for example the reaction of titanium tetrabutoxide with DI3 and chloronaphthalene followed by washing.

Also, in another object of the present invention there are provided processes for the preparation of titanyl phthalocyanines, especially titanyl phthalocyanine Type 1a with small average diameter particle sizes, for example from about 0.05 to about 0.5 micron, as determined by SEM (scanning electron microscopy). Layered imaging members comprised of the aforementioned titanyl phthalocyanines possess excellent photosensitivity characteristics.

Another object of the present invention resides in a process for the preparation of Type 1a titanyl phthalocyanine with excellent xerographic photosensitivity. The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value $V_o$ of about $-800$ volts. After resting for 0.5 second in the dark, the charged members attained a surface potential of $V_{ddp}$, dark development potential, and each member was then exposed to light from a filtered Xenon lamp with a XBO 150 watt bulb. A reduction in surface potential to a $V_{bg}$ value, background potential, due to photodischarge effect was observed. The dark decay in volts/second was calculated as $(V_o-V_{ddp})/0.5$. The percent of photodischarge was calculated as 100 percent $(V_{ddp}-V_{bg})/V_{ddp}$. The desired wavelength and energy of the exposed light was determined by the type of filters placed in front of the lamp. The broad band white light (400 to 700 nanometers) photosensitivity of these imaging members was measured by using an infrared cut-off filter whereas the monochromatic light photosensitivity was determined using a narrow band-pass filter. The photosensitivity of the imaging members is usually provided in terms of the amount of expose energy in ergs/cm$^2$, designated as $E_{\frac{1}{2}}$, required to achieve 50 percent photodischarge from the dark development potential. The higher the photosensitivity, the smaller is the $E_{\frac{1}{2}}$ value.

The more perfect crystal form of the Type 1 a titanyl phthalocyanine obtained in embodiments with the processes of the present invention possesses excellent xerographic characteristics when fabricated into suitable electrophotographic layered imaging members, for example it is believed an $E_{\frac{1}{2}}$ is equal to 2.5 ergs/cm$^2$, a dark decay is of 7 to 15 volts/second, and a percent discharge is at 5 and 10 ergs/cm$^2$ (incident light at 780 nanometers) of 75 and 88 percent, respectively, when the aforementioned Type 1a was selected as a photogenerator in a layered imaging member. The final product can be obtained after the solid has been dried at a temperature of from about 25° to about 150° C. for a time of 1 hour to about 24 hours, for example either in the air or under vacuum. A yield corresponding to about 95 percent to about 75 percent of the weight of the starting pigment can be obtained. The polymorphic form of the final pigment was determined by XRPD analysis and Raman spectroscopy, and it was determined that a more perfect crystal form of Type 1a had been prepared, and that it remained in this form of Type 1a after three months, again as determined by XRPD analysis. One important characteristic associated with imaging members containing the more perfect crystal form of Type 1a titanyl phthalocyanines obtained with the processes of the present invention include a low, 3 to 5 percent, cycle down of the dark decay potential after 50,000 imaging cycles, as compared to the precursor Type 1a titanyl phthalocyanine, which exhibits cycle down of the dark decay potential of 20 to 40 percent, and commercial electrophotographic imaging members incorporating Type I titanyl phthalocyanine which typically exhibit over 10 percent cycle down of the dark decay potential after 50, 000 imaging cycles, and an E1/2 of about 4.6 ergs/cm2 at 780 nanometers.

Moreover, another object of the present invention relates to the preparation of certain titanyl phthalocyanines with high purities, and the use thereof in electrophotographic processes.

Additionally, another object of the present invention relates to the preparation of titanyl phthalocyanine polymorph Type 1a in acceptable yields of, for example, exceeding about 75 percent, and a high purity of, for example, about 99 percent in embodiments of the present invention.

A further specific object of the present invention resides in the provision of photoresponsive imaging members with an aryl amine hole transport layer, and a photogenerator layer comprised of titanyl phthalocyanine pigment components obtained by the processes illustrated herein.

These and other objects of the present invention can be accomplished in embodiments thereof by the provision of imaging members and processes for the preparation of titanyl phthalocyanines. More specifically, in embodiments of the present invention there are provided processes for the preparation of titanyl phthalocyanine (TiOPc) Type 1a polymorph, which comprises dissolving Type I titanyl phthalocyanine in, for example, a strong acid, like sulfuric acid or trifluoroacetic acid, and thereafter reprecipitating the dissolved titanyl phthalocyanine pigment by adding it dropwise to a chilled portion of solvent, such as an aliphatic alcohol with from 1 to about 12 carbon atoms, such as methanol, water, or mixtures thereof, and thereafter contacting the isolated Type X phthalocyanine with hot chlorobenzene at a temperature of from about 60° C. to about 130° C. for a period of from about 2 hours to about 24 hours, and preferably about 4 hours. Alternatively, the Type X can be treated with 1-chloronaphthalene at a temperature of from about 25° C. to about 225° C. for a period of from about 30 minutes to about 24 hours, and preferably about 2 hours.

In embodiments, the present invention relates to processes for the preparation of titanyl phthalocyanines and photoresponsive imaging members thereof. More specifically, in embodiments of the present invention there are provided processes for the preparation of titanyl phthalocyanine (TiOPc) Type 1a polymorphs, which comprise the solubilization of a precursor titanyl phthalocyanine Type I, which can be obtained by the reaction of diiminoisoindoline and titanium tetrabutoxide in the presence of a solvent, such as chloronaphthalene, reference U.S. Pat. No. 5,189,156 (D/91152), the disclosure of which is totally incorporated herein by reference, in a mixture of a trihaloacetic acid, such as trifluoroacetic acid, and an alkylene halide such as methylene chloride, precipitation of the desired titanyl phthalocyanine Type X, separation by, for example, filtration, and thereafter subjecting the product to a slurry treatment with a halobenzene like chlorobenzene, or chloronaphthalene at a temperature sufficient to induce conversion of the Type X pigment to a more perfect crystal form of Type I titanyl phthalocyanine than was synthesized. The product can be identified by various known means including X-ray powder diffraction analysis (XRPD) and Raman spectroscopy.

Embodiments of the present invention are directed to processes for the preparation of a more perfect crystal form of titanyl phthalocyanine Type 1a, as determined by X-ray powder diffraction, which comprises dissolving a precursor titanyl phthalocyanine Type I in a mixture of trifluoroacetic acid and methylene chloride; adding the resulting mixture to a stirred organic solvent, such as an aliphatic alcohol, with from about 1 to about 12 carbon atoms like methanol, water or mixtures thereof; separating the resulting precipitate of Type X by, for example, vacuum filtration through a glass fiber paper in a Buchner funnel; forming a slurry of the obtained Type X pigment with hot chlorobenzene at a temperature equal to or exceeding 60° C. for a period of from about 2 hours to about 24 hours, and preferably about 2 hours. Alternatively, the Type X can be treated with 1-chloronaphthalene at a temperature of from about 25° C. to about 225° C. for a period of from about 30 minutes to about 24 hours, and preferably about 2 hours, and isolating thereform the desired Type 1a titanyl phthalocyanine having less crystalline defects when compared to the precursor Type I titanyl phthalocyanine.

Examples of titanyl phthalocyanine reactants, especially Type 1a, that can be selected for the processes of the present invention in effective amounts of, for example, from about 1 weight percent to about 40 percent by weight and preferably about 10 percent of the weight of the trihalo like trifluoroacetic acidic solvent mixture, include known available titanyl phthalocyanines; titanyl phthalocyanines synthesized from the reaction of titanium halides such as titanium trichloride, titanium tetrachloride or tetrabromide; titanium tetraalkoxides such as titanium tetra-methoxide, -ethoxide, -propoxide, -butoxide, -isopropoxide and the like; and titanium salts. These titanyl phthalocyanines Type I can be reacted with, for example, phthalonitrile and diiminoisoindolene in solvents such as 1-chloronaphthalene, quinoline, N-methylpyrrolidone, such that the solids contained in the reaction range in an amount of from about 5 percent to about 40 percent and preferably about 20 percent and alkylbenzenes such as xylene at temperatures of from about 120° to about 300° C. to provide the precursor Type I titanyl phthalocyanine.

As the solvent mixture for the Type I titanyl phthalocyanine, obtained as illustrated herein or obtained from other sources, there can be selected a strong organic acid, such as a trihaloacetic acid, including trifluoroacetic acid or trichloroacetic acid, and a cosolvent, such as an alkylene halide wherein alkylene contains from 1 to about 12 carbon atoms, such as methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to 50 parts of acid to about 50 parts of cosolvent such as methylene chloride. In an embodiment of the present invention, a preferred solvent mixture is comprised of trifluoroacetic acid and methylene chloride in a ratio of from about 5 parts of acid to about 95 parts of methylene chloride to 25 parts of acid to 75 parts of methylene chloride.

Subsequent to solubilization with the above solvent mixture and stirring for an effective period of time of, for example, from about 5 minutes to about 24 hours, the resulting mixture is added to a solvent in an amount of from about 1 volume part to about 100 volume parts and preferably about 10 volume parts per part of acid that is used to dissolve the Type I pigment, which solvent is comprised of an alcohol such as methanol, ethanol, propanol, isopropanol, butanol, n-butanol, pentanol and the like; water and mixtures thereof; followed by filtration of the titanyl phthalocyanine polymorph Type X, and washing with various solvents such as, for example, deionized water and an alcohol such as methanol and the like, which serves to remove residual acid and any impurities which might have been released by the process of dissolving and reprecipitating the pigment. The solid resulting can then be dried by, for example, heating yielding a dark blue pigment of the desired titanyl phthalocyanine Type X polymorph, as determined by XRPD analysis. The Type X obtained is then treated with a hot halobenzene like chlorobenzene in an amount of from about 10 volume parts to about 100 volume parts, and preferably about 50 volume parts per weight part of pigment. The Type X pigment can be stirred in the hot halobenzene at a temperature of from about 60° C. to about 130° C. and preferably about 90° C. for a period of from about 30 minutes to about 24 hours and preferably about 2 hours to enable the polymorphic conversion to the stable product Type 1a with excellent photosensitivity, which can be separated therefrom by, for example, filtration.

In an embodiment of the present invention, there is provided a process for the preparation of the more perfect crystal form of the Type 1a polymorph of titanyl phthalocyanine as determined by its XRPD, which process comprises 1) dissolving the precursor pigment, Type I titanyl phthalocyanine, in a mixture of trifluoroacetic acid and methylene chloride comprised of from 5 percent acid to about 25 percent acid and 95 parts to 75 parts of methylene chloride, wherein the amount of precursor pigment is, for example, from 5 parts to about 25 parts of the precursor pigment to 100 parts of acid solution by adding the pigment to the solution and stirring the mixture for an effective period of time, for example from about 5 minutes to about 24 hours, and in an embodiment about 15 minutes at a temperature of from about 0° to about 50° C.; 2) pouring or adding the resultant solution into a rapidly stirred precipitant solvent in a ratio of from about 1 part of the aforementioned pigment solution to 2 parts of precipitant solution to about 1 part pigment solution to about 50 parts of precipitant at a temperature of from about 0° to about 100° C. over a period of from 1 minute to about 60 minutes to ensure rapid efficient mixing; and in an embodiment, the precipitant solution was stirred at a rate sufficient to form a deep vortex in the reaction vessel, and the pigment solution was poured in a slow stream into the side of the vortex; 3) following the addition, the resultant dispersion of the polymorphic form Type X of titanyl phthalocyanine was stirred at a temperature of from 0° to about 100° C. for a period of from about 5 minutes to about 24 hours; 4) subsequently separating the titanyl phthalocyanine Type X from the mother liquor by filtration, for example through a glass fiber filter in a porcelain filter funnel, and washing the product titanyl phthalocyanine Type X pigment in the funnel with an effective amount of solvent, for example from about 200 parts of wash solvent to about 1 part of the starting pigment, such as methanol, to remove most of the acidic mother liquor; 5) redispersing the resulting wet cake in a solvent, such as methanol, acetone, water, and the like in an effective amount of, for example, from about 20 parts to about 100 parts of solvent to 1 part of the pigment for a period of from about 5 minutes to 24 hours at a temperature of from 0° C. to about 100° C., the primary purpose of such washing being to further remove any residual acid or other impurities from the Type X TiOPc which resulted from the precipitation process; 6) isolating the desired titanyl phthalocyanine polymorph Type X: by, for example, filtration through a glass fiber filter as in step (4); and (7) contacting the Type X obtained with hot chlorobenzene in an amount of from about 10 volume parts to about 100 volume parts, and preferably about 50 volume parts per weight part of Type X pigment. The mixture was stirred by magnetic stirring bar at a temperature of from about 60° C. to about 130° C. for a period of from about 30 minutes (100° C.) to about 24 hours, and preferably about 2 to 4 hours, when complete conversion of the Type X: polymorph to the Type 1a polymorph is accomplished, as evidenced by monitoring the polymorphic conversion by X-ray powder diffraction analysis, and more specifically at 130° C. stirring was accomplished for 15 minutes, at 60° C. stirring was accomplished for 2 hours. The treated Type I a pigment was isolated by, for example, filtration through a glass microfiber filter, and oven dried in air at a temperature of 50° C. for a period of 4 hours. X-ray powder diffraction analysis of the resulting pigment provided a pattern substantially different from the Type I precursor material. It is important that the stirring time in hot chlorobenzene be regulated to enable conversion to Type 1a titanyl phthalocyanine in embodiments; thus at 130° C., stirring in hot chlorobenzene is accomplished for at least 15 minutes to about 1 hour; at 60° C., stirring is accomplished for at least about 2 hours; and stirring for at least 30 minutes and up to 2 hours at 100° C.

In another embodiment of the present invention, the aforementioned Type X titanyl phthalocyanine is converted to a crystalline form of Type I which is more perfect than the Type I precursor material by contacting the Type X obtained with chloronaphthalene in an amount of from about 10 volume parts to about 100 volume parts, and preferably about 50 volume parts per weight part of Type X pigment. The mixture was stirred by magnetic stirring bar at a temperature of from about 25° C. to about 225° C. and preferably about 50° C. for a period of from about 30 minutes to about 24 hours, and preferably about 2 hours, when complete conversion of the Type X polymorph to the Type 1a polymorph had occurred, as evidenced by monitoring the polymorphic conversion by X-ray powder diffraction analysis. The treated Type 1a pigment was isolated by, for example, filtration through a glass microfiber filter, and oven dried in air at a temperature of 50° C. for a period of 4 hours. X-ray powder diffraction analysis of the resulting pigment provided a pattern substantially different from the Type I precursor material.

Processes for the preparation of titanyl phthalocyanine Type I selected for the present invention can be accomplished by the reaction of titanium tetraalkoxide, especially the tetrabutoxide with diiminoisoindolene in a halo, such as chloronaphthalene solvent to provide crude Type I titanyl phthalocyanine, which is subsequently washed with a component such as dimethylformamide to provide a pure form of Type I as determined by X-ray powder diffraction.

For the preparation of Type I titanyl phthalocyanine, the process can comprise the reaction of DI$^3$ (1,3-diiminoisoindolene) and tetrabutoxide in the presence of 1-chloronaphthalene solvent, whereby there is obtained a crude titanyl phthalocyanine Type I, which is subsequently purified, up to about a 99.5 percent purity, by washing with, for example, dimethylformamide. More specifically, Type I can be prepared by the addition of 1) 1 part titanium tetrabutoxide to a stirred solvent halonaphthalene solution with from about 1 part to about 10 parts and preferably about 4 parts of 1,3-diiminoisoindolene; 2) relatively slow application of heat using an appropriate sized heating mantle at a rate of about 1 degree per minute to about 10 degrees per minute and preferably about 5 degrees per minute until refluxing occurs at a temperature of about 130 degrees to about 180 degrees; 3) removal and collection of the resulting distillate, which was shown by NMR spectroscopy to be butyl alcohol, in a dropwise manner, using an appropriate apparatus, such as a Claisen Head condenser, until the temperature of the reactants reaches from 190° C. to about 230° C. (all temperatures are in Centigrade unless otherwise indicated) and preferably about 200° C.; 4) continued stirring at said reflux temperature for a period of about ½ hour to about 8 hours and preferably about 2 hours; 5) cooling of the reactants to a temperature of about 130° C. to about 180° C. and preferably about 1600° C. by removal of the heat source; 6) filtration of the flask contents through, for example, an M-porosity (10 to 15 μm) sintered glass funnel which was preheated using a solvent which is capable of raising the temperature of said funnel to about 150° C., for example, boiling N,N-dimethylformamide in an amount sufficient to completely cover the bottom of the filter funnel so as to prevent blockage of said funnel; 7) washing the resulting purple solid by slurrying said solid in portions of boiling DMF either in the funnel or in a separate vessel in a ratio of about 1 to about 10, and preferably about 3 times the volume of the solid being washed, until the hot filtrate became light blue in color; 8) cooling and further washing the solid of impurities by slurrying said solid in portions of N,N-dimethylformamide at room temperature, about 25° C., approximately equivalent to about three times the volume of the solid being washed, until the filtrate became light blue in color; 9) washing the solid of impurities by slurrying said solid in portions of an organic solvent, such as methanol, acetone, water and the like, and in an embodiment methanol, at room temperature, about 25° C., approximately equivalent to about three times the volume of the solid being washed, until the filtrate became light blue in color; and 10) oven drying the purple solid in the presence of a vacuum or in air at a temperature of from about 25° C. to about 200° C. and preferably about 70° C. for a period of from about 2 hours to about 48 hours and preferably about 24 hours thereby resulting in the isolation of a shiny purple solid which was identified as being Type I titanyl phthalocyanine by its X-ray powder diffraction trace.

The Type I titanyl phthalocyanine obtained can then be converted to Type X titanyl phthalocyanine by the dissolution thereof in trifluoroacetic acid and methylene chloride, and thereafter reprecipitating the product obtained in a solvent mixture of, for example, methanol and water, reference U.S. Pat. No. 5,166,339 (D/90198), the disclosure of which has been totally incorporated herein by reference. In a specific embodiment of the present invention, the Type I titanyl phthalocyanine obtained can be converted to Type X by 1) dissolving 1 weight part of the Type I pigment in a ratio of from about 1 volume part to about 100 volume parts and in an embodiment about 10 volume parts of a solvent comprised of 1 volume part of a haloacetic acid, and in an embodiment trifluoroacetic acid, and from about 1 volume part to about 100 volume parts and preferably from about 1 volume part to about 10 volume parts, and in an embodiment 4 volume parts of a cosolvent comprised of halogenated hydrocarbons such as methylene chloride by stirring said pigment in said solvent mixture for an effective period of time, from about 30 seconds to about 24 hours, and in an embodiment about 5 minutes at room temperature, about 25° C., in air or under an inert atmosphere such as argon or nitrogen; 2) reprecipitating said dissolved Type I titanyl phthalocyanine pigment by adding the dissolved solution in a dropwise manner at a rate of about 0.5 milliliter per minute to about 10 milliliters per minute and in an embodiment about 1 milliliter per minute to a nonsolvent comprised of alcohols such as methanol, ethanol, isopropanol, butanol and the like, ketones such as acetone, methyl ethyl ketone, isobutyl ketone and the like, water, N,N-dimethylformamide, tetrahydrofuran or mixtures thereof, and in an embodiment a mixture comprised of 1 volume part of methanol and 1 volume part of water, which solvent mixture was chilled to a temperature of from about −25° C. to about 10° C. and in an embodiment about 2° C. while being stirred at a rate sufficient to create a vortex extending to the bottom of the flask containing said solvent mixture; 3) filtering the dark blue suspension through a glass fiber filter fitted in a porcelain funnel; 4) washing the isolated solid by redispersing in an organic solvent such as methanol or acetone or the like by stirring for a period of from about 1 minute to about 24 hours and in an embodiment about 1 hour in an amount of from about 10 volume parts to about 100 volume parts, and in an embodiment about 50 volume parts relative to the original weight of solid Type I pigment used, followed by filtration as illustrated herein; 5) further washing by redispersing in deionized water which was heated to a temperature of from about 75° C. to about 100° C. and in an embodiment about, 95° C. in an amount of from about 10 volume parts to about 100 volume parts, and in an embodiment about 50 volume parts relative to the original weight of solid Type I pigment used, followed by filtration as illustrated herein; 6) repeating step 5; and 7) drying the resulting blue pigment in air or in the presence of a vacuum at a temperature of from about 25° C. to about 200° C. and in an embodiment in air at about 70° C. for a period of from about 5 minutes to about 48 hours, and in an embodiment about 1 hour to afford a dark blue powder in a desirable yield of from about 75 percent to about 99 percent, and in an embodiment about 97 percent which has been identified as being Type X titanyl phthalocyanine on the basis of its XRPD spectrum. The aforementioned Type X titanyl phthalocyanine can be selected as a photogenerator for use in a layered photoconductive device or imaging member.

The Type X titanyl phthalocyanine obtained can then be treated with a hot halogenated aromatic solvent, such as chlorobenzene, to provide Type 1a titanyl phthalocyanine having excellent xerographic characteristics when selected as a photogenerator in a layered photoconductive imaging member with a supporting substrate and a charge transport layer. In an embodiment, the xerographic characteristics of the aforementioned imaging member with a titanyl phthalocyanine Type 1a photogenerator, an aryldiamine charge transport as the top layer, and an aluminum substrate in contact with the photogenerating layer were $E_{\frac{1}{2}}=0.8$ ergs/cm$^2$, dark decay=5 to 15 volts/second, and a discharge at 5 and 10 ergs/cm$^2$ of 87 and 90 percent, respectively.

In a specific embodiment, the Type X can be treated with hot, about 200° C., chlorobenzene immediately following the second hot water wash (step 6) by 1) redispersing the formed wet filter cake containing 1 part of solid Type X titanyl phthalocyanine obtained in hot chlorobenzene in an amount of from about 10 parts to about 100 parts and in this embodiment about 50 parts relative to the weight of solid Type X pigment used by stirring for an effective period of time, from about 5 minutes to about 2 hours, and in an embodiment about 1 hour, followed by filtering as above; and 2) drying the resulting blue pigment in air or in the presence of a vacuum at a temperature of from about 25° C. to about 200° C. and in an embodiment in air at about 70° C. for a period of from about 5 minutes to about 48 hours and in an embodiment about 2 to 4 hours to afford a dark blue powder in a desirable yield of from about 75 percent to about 99 percent and in an embodiment about 97 percent, which has been identified as being Type 1a titanyl phthalocyanine on the basis of its XRPD spectrum.

As one solvent mixture, especially for conversion of Type I, there can be selected a strong organic acid, such as a trihaloacetic acid, including trifluoroacetic acid or trichloroacetic acid, and a cosolvent, such as an alkylene halide like methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to about 50 parts of acid to about 50 parts of cosolvent such as methylene chloride. In an embodiment of the present invention, a preferred solvent mixture is comprised of trifluoroacetic acid and methylene chloride in a ratio of from about 5 parts of acid to about 95 parts of methylene chloride to about 25 parts of acid to about 75 parts of methylene chloride.

In an embodiment, subsequent to solubilization with the above solvent mixture and stirring for an effective period of time of, for example, from about 5 minutes to about two weeks, the resulting mixture is added to a solvent mixture that will enable precipitation of the desired titanyl phthalocyanine polymorph, such as Type X, which solvent mixture is comprised of an alcohol, such as an alkyl alcohol including methanol, ethanol, propanol, isopropanol, butanol, n-butanol, pentanol and preferably sulfuric acid, and the like, alone or with water in a ratio of from about 99 percent of solvent to about 1 percent of water to about 1 percent of solvent to about 99 percent of water; and reprecipitating the pigment, the morphology of which is dependent on the choice of solvent and precipitant solvent. The solid Type X pigment resulting can then be dried by, for example, oven heating in air or under vacuum at a temperature of from about 50° C. to about 200° C. and preferably about 70° C. for a period of from 5 minutes to about two weeks yielding a dark blue pigment of the desired titanyl phthalocyanine polymorph Type X.

Numerous different layered photoresponsive imaging members with the phthalocyanine pigments Type 1a, obtained by the processes of the present invention, can be fabricated. In embodiments, thus the layered photoresponsive imaging members are comprised of a supporting substrate, a charge transport layer, especially an aryl amine hole transport layer, and situated therebetween a photogenerator layer comprised of titanyl phthalocyanine Type 1a. Another embodiment of the present invention is directed to positively charged layered photoresponsive imaging members comprised of a supporting substrate, a charge transport layer, especially an aryl amine hole transport layer, and as a top overcoating titanyl phthalocyanine pigment Type 1a obtained with the processes of the present invention. Moreover, there is provided in accordance with the present invention an improved negatively charged photoresponsive imaging member comprised of a supporting substrate, a thin adhesive layer, a titanyl phthalocyanine Type 1a photogenerator obtained by the processes of the present invention dispersed in a polymeric resinous binder, and as a top layer aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater., wire-bar coater, slot coater, doctor blade coater, gravure coater, and the like, and dried at from 40° to about 200° C. for from 10 minutes to several hours under stationary conditions or in an air flow. The coating is accomplished to provide a final coating thickness of from 0.01 to about 30 microns after it has dried. The fabrication conditions for a given layer can be tailored to achieve optimum performance and cost in the final device.

Imaging members with the titanyl phthalocyanine pigments Type 1a of the present invention are useful in various electrostatographic imaging and printing systems, particularly those conventionally known as xerographic processes. Specifically, the imaging members of the present invention are useful in xerographic imaging processes wherein the titanyl phthalocyanine pigments absorb light of a wavelength of from about 600 nanometers to about 900 nanometers. In these known processes, electrostatic latent images are initially formed on the imaging member, followed by development, and thereafter transferring the image to a suitable substrate.

Moreover, the imaging members of the present invention can be selected for electronic printing processes with gallium arsenide light emitting diode (LED) arrays which typically function at wavelengths of from 660 to about 830 nanometers.

DESCRIPTION OF SPECIFIC EMBODIMENTS

A negatively charged photoresponsive imaging member of the present invention is comprised in the order stated of a supporting substrate, a solution coated adhesive layer comprised, for example, of a polyester 49,000 available from Goodyear Chemical, a photogenerator layer comprised of titanyl phthalocyanine, Type 1a, obtained with the process of the present invention, optionally dispersed in an inactive resinous binder, and a hole transport layer comprised of N,N'-diphenyl-N,N'-bis(3-methyl phenyl)-1,1'-biphenyl-4,4'-diamine dispersed in a polycarbonate resinous binder.

A positively charged photoresponsive imaging member of the present invention is comprised in the order stated of a substrate, a charge transport layer comprised of N,N,-diphenyl-N,N'-bis(3-methyl phenyl)-1,1'-biphenyl-4,4'-diamine dispersed in a polycarbonate resinous binder, and a titanyl phthalocyanine Type 1a photogenerator layer obtained with the process of the present invention, optionally dispersed in an inactive resinous binder.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKRO ®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns With further regard to the imaging members, the photogenerator layer is preferably comprised of the titanyl phthalocyanine pigments obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the titanyl phthalocyanine photogenerator composition is present in an amount of from about 5 percent to about 100 percent by volume. In one embodiment, this layer is of a thickness of from about 0.25 micron to about 1 micron when the photogenerator composition is present in this layer in an amount of 30 to 75 percent by volume. The maximum thickness of this layer in an embodiment is dependent primarily upon factors, such as photosensitivity, electrical properties and mechanical considerations. The charge generator layer can be obtained by dispersion coating the TiOPc Type 1a obtained with the processes of the present invention, and a binder resin with a suitable solvent. The binder may be omitted. The dispersion can be prepared by mixing and/or milling the TiOPc in equipment, such as paint shakers, ball mills, sand mills and attritors. Common grinding media, such as glass beads, steel balls or ceramic beads, may be used in this equipment. The binder resin may be selected from a number of known polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device. Examples of solvents useful for coating TiOPc dispersions to form a photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the TiOPc dispersion in embodiments of the present invention can be accomplished with spray, dip or wire-bar methods such that the final dry thickness of the charge generator layer is from 0.01 to 30 microns and preferably from 0.1 to 15 microns after being dried at 40 to 150° C. for 5 to 90 minutes.

Illustrative examples of polymeric binder resinous materials that can be selected for the photogenerator pigment include those polymers as disclosed in U.S. Pat. No. 3,121,006, the disclosure of which is totally incorporated herein by reference.

As adhesives usually in contact with the supporting substrate, there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles, such as zinc oxide, titanium dioxide, silicon nitride, carbon black, and the like, to provide, for example, in embodiments of the present invention desirable electrical and optical properties, Aryl amines selected for the hole transporting layer, which generally is of a thickness of from about 5 microns to about 75 microns, and preferably of a thickness of from about 10 microns to about 40 microns, include molecules of the following formula

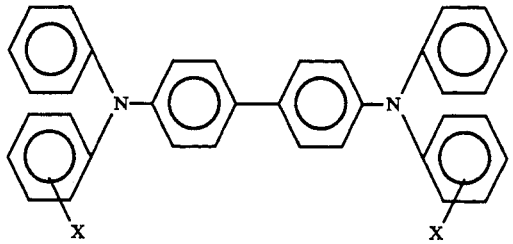

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known charge transport layer molecules can be selected, reference for example U.S. Pat. Nos. 4,921,773 and 4,464,450, the disclosures of which are totally incorporated herein by reference.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as biotic, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The following Examples are provided.

EXAMPLE I

Synthesis of Type I Titanyl Phthalocyanine

A 250 milliliter three-necked flask fitted with mechanical stirrer, condenser and thermometer maintained under an atmosphere of argon was charged with 1,3-diiminoisoindolene (14,5 grams–0.1 mole), titanium tetrabutoxide (8.5 grams–0.025 mole, available from Aldrich) and 75 milliliters of 1-chloronaphthalene. The mixture was stirred and warmed. At 140° C. the mixture turned dark green and began to reflux. At this time, the vapor (this was identified as n-butanol by gas chromatography) was allowed to escape to the atmosphere until the reflux temperature reached 200° C. The reaction was maintained at this temperature for two hours then was cooled by removal of the heat source to 150° C. The product was filtered through a 150 milliliter M-porosity sintered glass funnel which was preheated to approximately 150° C. with boiling DMF, and then washed thoroughly with three portions of 100 milliliters of boiling DMF, followed by washing with three portions of 100 milliliters of DMF at room temperature, and then three portions of 50 milliliters of methanol, providing 10.3 grams (72 percent yield) of a shiny purple pigment which was identified as Type I TiOPc by XRPD.

EXAMPLE IA

Synthesis of Type I Titanyl Phthalocyanine

A titanyl phthalocyanine pigment was prepared by repeating the process of Example I, except that 75 milliliters of N-methylpyrrolidone were selected together with 1,3-diiminoisoindolene (14.5 grams–0.1 mole), and titanium tetrabutoxide (8.5 grams–0.025 mole; Aldrich). There resulted 9.6 grams (67 percent) of a shiny purple solid which was identified as Type I titanyl phthalocyanine by XRPD.

EXAMPLE II

The above precursor titanyl phthalocyanine Type I was evaluated as a photogenerator pigment in xerographic imaging devices which were prepared by the following procedure. An aluminized Mylar ® substrate (3 mils) was coated with a solution containing zirconlure oxide precursor and silane, prepared by dissolving 6.5 grams of ZC540 [$(C_5H_7O_2)Zr(OC_4H_9)_3$] and 0.75 gram of A1110 [$(NH_2C_3H_6)Si(OCH_3)_3$] in 14.25 grams of n-butanol and 28.5 grams of isopropanol, using a wire wound rod applicator. This layer was dried at 138° C. for 10 minutes; the final thickness was measured to be 0.1 micron. A dispersion of the TiOPc was prepared in a paint shaker device by milling 0.56 gram of the precursor Type I TiOPc polymorph of this Example, and 20 grams of 1.3 percent poly(vinyl butyral) in butyl acetate in a 60 milliliter jar containing 70 grams of glass beads (1 millimeter diameter). The dispersion was milled for 2 hours then was coated onto the $Zr_2O_3$ layer described above using a wire wound rod applicator. The thus formed photogenerating layer was dried at 100° C. for 10 minutes; its final thickness was determined to be about 0.20 micron. Hole transporting layer solutions were prepared by dissolving 5.4 grams of N,N'-diphenyl-N,N-bis(3-methyl phenyl)-1,1'-biphenyl-4,4'-diamine, 8.1 grams of polycarbonate in 57.6 grams of chlorobenzene. The solution was coated onto the TiOPc generator layer using a 10 mil film applicator. The charge transporting layer thus obtained was dried at I 115° C. for 60 minutes to provide a final thickness of about 28 microns.

The xerographic electrical properties of the photoresponsive imaging members were determined, in duplicate experiments, by electrostatically charging the surface thereof with a corona discharge source until the surface potential, as measured by a capacitatively coupled probe attached to an electrometer, attained an initial dark value, $V_o$, of about $-800$ volts. After resting for 0.5 second in the dark, the charged member reached a surface potential, $V_{ddp}$, or dark development potential. The member was then exposed to monochromatic light (780 nanometers) from a Xenon lamp equipped with neutral density filters. A reduction in surface potential from $V_{ddp}$ to a background potential, $V_{bg}$, due to the photodischarge effect was observed. The dark decay in volts per second was calculated as $(V_o-V_{ddp})/0.5$. The percent of photodischarge was calculated as $100 \times (V_{ddp}-V_{bg})V_{ddp}$. The half-exposure energy, $E_{\frac{1}{2}}$, the required exposure energy causing reduction of the $V_{ddp}$ to half of its initial value, was determined. Xerographic electrical characteristics of the photogenerator pigment prepared in this Example are shown in Table 1 (Sample #24960-35).

EXAMPLE III

Preparation of Type 1a TiOPc

Ten grams of Type I TiOPc, prepared as described in Example I, were dissolved in 100 milliliters of a mixture of trifluoroacetic acid and methylene chloride (1:4, v/v), and added over a 2 minute period to a rapidly stirred solution of methanol (500 milliliters) and water (500 milliliters). The resultant coarse suspension was stirred at room temperature, about 25° C., for 45 minutes, then was allowed to settle. The supernatant liquid was decanted and the blue residue was redispersed in 500 milliliters of methanol by stirring for 30 minutes. The suspension was filtered using a 15 centimeter diameter glass fiber filter in a porcelain funnel. The solid was then twice redispersed in 500 milliliters of hot (about 90° C.) deionized water and filtered by vacuum filtration through a 15 centimeter diameter porcelain funnel which was fitted with a Whatman 934-AH grade filter fiber. Finally, the solid, which was identified as Type X titanyl phthalocyanine on the basis of its XRPD spectrum, was stirred in 500 milliliters of hot monochlorobenzene at 60° C. Samples, about 1 gram, were withdrawn from the mixture at periods of 15, 30, 60, and 120 minutes after remaining at 60° C. of contact with the chlorobenzene. Each sample was immediately cooled to room temperature, filtered and oven dried at a temperature of 70° C. for a period of I hour to provide approximately 1 gram of a crystalline titanyl phthalocyanine pigment, which was examined by X-ray Powder Diffraction analysis. The samples heated for 15, 30 and 60 minutes were identified as Type IV titanyl phthalocyanine in each instance, while the sample heated in chlorobenzene for 120 minutes was Type 1a titanyl phthalocyanine as determined by XRPD diffraction pattern traces.

EXAMPLE IV

Preparation of Type 1a TiOPc

The process of Example III was repeated except that the solid Type X titanyl phthalocyanine was stirred in 500 milliliters of monochlorobenzene at 130° C. Samples, 1 gram, were withdrawn from the mixture at periods of 15, 30, 60, and 120 minutes of contact with the chlorobenzene. Each sample was immediately cooled to room temperature, filtered and oven dried at a temperature of 70° C. for a period of 1 hour to provide approximately 1 gram of a crystalline Type 1a pigment, which was examined by X-ray Powder Diffraction analysis. Each sample was found to be substantially identical and was identified as being Type 1a titanyl phthalocyanine by XRPD.

EXAMPLE V

Preparation of Type 1a TiOPc

The process of Example III was repeated except that the solid Type X titanyl phthalocyanine was stirred in 500 milliliters of 1-chloronaphthalene at 25° C. for a period of 2 hours. The pigment (titanyl phthalocyanine Type 1a) was filtered and oven dried at a temperature of 70° C. for a period of 1 hour to provide a purple crystalline pigment which was found to be Type 1a titanyl phthalocyanine as determined by X-ray Powder Diffraction analysis.

EXAMPLE VI

Preparation of Type 1a TiOPc

The process of Example III was repeated except that the solid Type X titanyl phthalocyanine was stirred in 500 milliliters of 1-chloronaphthalene at 200° C. for a period of 2 hours. The pigment (titanyl phthalocyanine Type 1a) was filtered and oven dried at a temperature of 70° C. for a period of 1 hour to provide a purple crystalline pigment which was found to be Type 1a titanyl phthalocyanine as determined by X-ray Powder Diffraction analysis.

Other modifications of the present invention may occur to those skilled in the art subsequent to a review of the present application and these modifications, including equivalents thereof, are intended to be included within the scope of the present invention.

What is claimed is:

1. A process for the preparation of titanyl phthalocyanine Type 1a which consists essentially of admixing Type I titanyl phthalocyanine with a mixture of trihaloacetic acid and alkylene halide; adding the resulting dissolved titanyl phthalocyanine pigment to a solvent mixture thereby enabling reprecipitation of titanyl phthalocyanine Type X; and subsequently contacting for a period of from about 15 minutes to about 2 hours the Type X titanyl phthalocyanine formed with hot chlorobenzene; and wherein said hot chlorobenzene is at a temperature of from about 60° C. to about 130° C.

2. A process for the preparation of titanyl phthalocyanine Type 1a which consists essentially of dissolving Type I titanyl phthalocyanine in a strong acid; reprecipitating the dissolved acid by addition to a solvent, whereby Type X titanyl phthalocyanine is formed; and subsequently contacting for a period of from about 15 minutes to about 2 hours the isolated Type X titanyl phthalocyanine with hot chlorobenzene; and wherein said hot chlorobenzene is at a temperature of from about 60° C. to about 130° C.

3. A process in accordance with claim 2 wherein the acid is trifluoroacetic acid.

4. A process in accordance with claim 2 wherein the acid is comprised of a mixture of trifluoroacetic acid and a halocarbon solvent.

5. A process in accordance with claim 2 wherein the acid is comprised of a mixture of 1 volume part of trifluoroacetic acid and 4 volume parts of methylene chloride.

6. A process in accordance with claim 2 wherein the acid/solvent mixture is present in an amount of from about 1 volume part to about 100 volume parts per weight part of titanyl phthalocyanine Type I.

7. A process in accordance with claim 2 wherein the solvent is an organic solvent, water, or mixtures thereof.

8. A process in accordance with claim 2 wherein the solvent is comprised of a mixture of 1 volume part of methanol and 1 volume part of water.

9. A process in accordance with claim 2 wherein the solvent is comprised of a mixture of methanol and water present in an amount of from about 1 volume part to about 500 volume parts per weight part of titanyl phthalocyanine Type I.

10. A process in accordance with claim 2 wherein the halobenzene is chlorobenzene.

11. A process in accordance with claim 10 wherein the chlorobenzene is present in an amount of from about 5 volume parts to about 200 volume parts per weight part of titanyl phthalocyanine Type pigment.

12. A process in accordance with claim 10 wherein the chlorobenzene is present in an amount of from about 20 volume parts to about 100 volume parts per weight part of titanyl phthalocyanine Type I pigment.

13. A process in accordance with claim 2 wherein said hot halobenzene is chlorobenzene, and said hot is at a temperature of from about 60° C. to about 130° C.

14. A process in accordance with claim 2 wherein said hot is at a temperature of from about 80° C. to about 110° C.

15. A process in accordance with claim 2 wherein said hot is at a temperature of 100° C.

16. A process in accordance with claim 2 wherein the Type X pigment is stirred in hot chlorobenzene at a temperature of 60° C. for at least two hours.

17. A process in accordance with claim 2 wherein the Type X pigment is stirred in hot chlorobenzene at a temperature of 100° C. for from about 30 minutes to about 5 hours, or wherein the Type X pigment is stirred in hot chlorobenzene at a temperature of 130° C. for from about 15 minutes to about 2 hours.

18. A process for the preparation of titanyl phthalocyanine Type 1a which comprises dissolving Type I titanyl phthalocyanine in a mixture comprised of 1 volume part of trifluoroacetic acid to 4 volume parts of methylene chloride in an amount of from about 1 volume part to about 100 volume parts per weight part of Type I titanyl phthalocyanine pigment; reprecipitating the titanyl phthalocyanine by addition to a solvent comprised of equal volume parts of methanol and water, in an amount of from about 1 volume part to about 500 volume parts of said solvent mixture per weight part of dissolved Type I pigment, whereby Type X titanyl phthalocyanine is formed; and subsequently contacting for a period of from about 15 minutes to about 2 hours the isolated Type X titanyl phthalocyanine with hot chlorobenzene at a temperature of from about 60° C. to about 130° C.

19. A process in accordance with claim 1 wherein there results 13.1, 15.0, 15.6, 16.0, 20.6, 23.2, 25.3, 26.2, 26.5, and 27.1 degrees (±0.2 degrees).

20. A process in accordance with claim 2 wherein there results Type 1a titanyl phthalocyanine with Bragg angles(2Θ) at 6.8, 9.2, 10.4, 12.3, 13.1, 15.0, 15.6, 16.0, 20.6, 23.2, 25.3, 26.2, 26.5, and 27.1 degrees (±0.2 degrees).

21. A process in accordance with claim 2 wherein the X-ray diffraction pattern of the Type 1a titanyl phthalocyanine polymorph has a peak at a Bragg angle (2Θ) of 6.8° (±0.2°), which is of an intensity of about 2 percent relative to the major peak in the trace at 26.2°; a peak at 9.2° (±0.2°), which is of an intensity of about 80 percent relative to the major peak in the trace at 26.2°; a peak at 10.4° (±0.2°), which is of intensity of about 50 percent relative to the major peak in the trace at 26.2°; a peak at 13.1° (±0.2°), which is of intensity of about 60 percent relative to the major peak in the trace at 26.2°; a peak at 15.0° (±0.2°), which is of intensity of of about 40 percent relative to the major peak in the trace at 26.2°; a peak at 15.6° (±0.2°), which is of intensity of about 25 percent relative to the major peak in the trace at 26.2°; a peak at 16.0° (±0.2°), which is of intensity of about 25 percent relative to the major peak in the trace at 26.2°; a peak at 20.6° (±0.2°), which is of intensity of about 25 percent relative to the major peak in the trace at 26.2°; a resolved peak at 26.5° (±0.2°), which is of intensity of about 10 percent relative to the major peak in the trace at 26.2°; and a peak at 27.1° (±0.2°), which is of intensity of about 20 percent relative to the major peak in the trace at 26.2°.

22. A process in accordance with claim 2 wherein the X-ray diffraction pattern for the Type 1a polymorph has peaks at Bragg angles (2Θ) of 15.6 and 16.0° having approximately equal intensities, not more than 80 percent of the intensity of the peak at 15.0°, intensity of at least 2 percent relative to the major peak in the trace at 26.2°, and no peak at 7.5°.

23. A process in accordance with claim 2 wherein the particle size of the Type 1a titanyl phthalocyanine product is substantially smaller, from about 0.1 micron to about 10 microns, than the Type I titanyl phthalocyanine reactant.

24. A process in accordance with claim 2 wherein said chlorobenzene heated at 130° C. for a period of from about 15 minutes to about 120 minutes; said chlorobenzene is heated at 60° C. for at least 2 hours; or said chlorobenzene is heated at 100° C. for a period of at about 30 minutes to about 2 hours; and wherein said Type X titanyl phthalocyanine is in contact with said hot chlorobenzene for said time periods.

25. A process in accordance with claim 1 wherein the hot chlorobenzene is at a temperature of about 130° C., and said contacting with said chlorobenzene is for a period of about 15 to about 120 minutes.

26. A process in accordance with claim 1 wherein said chlorobenzene is at a temperature of 60° C., and wherein said contacting is accomplished for 120 minutes.

* * * * *